INVENTOR.
FRANCIS J. SINES
By Donald G. Dalton
Attorney

Nov. 7, 1967  F. J. SINES  3,351,551
METHOD AND APPARATUS FOR REMOVING SOLID PARTICLES FROM LIQUIDS
Filed April 1, 1965  2 Sheets-Sheet 2

INVENTOR.
FRANCIS J. SINES
By Donald G. Dalton
Attorney

United States Patent Office 3,351,551
Patented Nov. 7, 1967

3,351,551
METHOD AND APPARATUS FOR REMOVING SOLID PARTICLES FROM LIQUIDS
Francis J. Sines, Youngstown, Ohio, assignor to United States Steel Corporation, a corporation of Delaware
Filed Apr. 1, 1965, Ser. No. 444,677
12 Claims. (Cl. 210—42)

This invention relates to a method and apparatus for removing particles, particularly mill scale, from water or other liquids. Specifically, the invention relates to the removal of small scale particles from the flushing water of a steel mill after the recovery of larger scale particles for use in the blast furnace or open hearth.

In the purification of scale flushing water, the water is first treated by aeration during which the insoluble oils held in suspension are floated to the top. Then, the larger scale particles are removed by passing the water through a bar screen, and the oils on the surface of the water are skimmed off and carried to an oil storage tank. With prior methods and means of purifying scale flushing water, the water is then pumped into large sedimentation basins where it sits for long periods of time to allow the fine mill scale particles to settle to the bottoms of the basins. After removal of these scale particles, the purified water is either directed into a storage lagoon from where it is pumped into the plant service water system for reuse, or it is discharged into a river.

The main problem with the conventional type of purification system lies in the long time that is required for the water to stand in the sedimentation basins before it is pure enough to be reused in the plant service water system or to be discharged into a river. Due to this long time, numerous large sedimentation basins are needed to purify the amount of scale flushing water that is discharged from a steel mill. These basins are costly to maintain and occupy much valuable land area.

An object of my invention, therefore, is to provide apparatus for purifying at a fast rate liquids contaminated with mill scale or other solid particles, without utilizing large and costly sedimentation basins.

Another object of my invention is to provide a method of removing solid particles from liquids which may be performed more quickly than by sedimentation in large basins and yet will achieve the desired degree of purification.

The attainment of these and other objects will appear more readily from the following description of my invention and the attached drawings in which.

Figure 1:
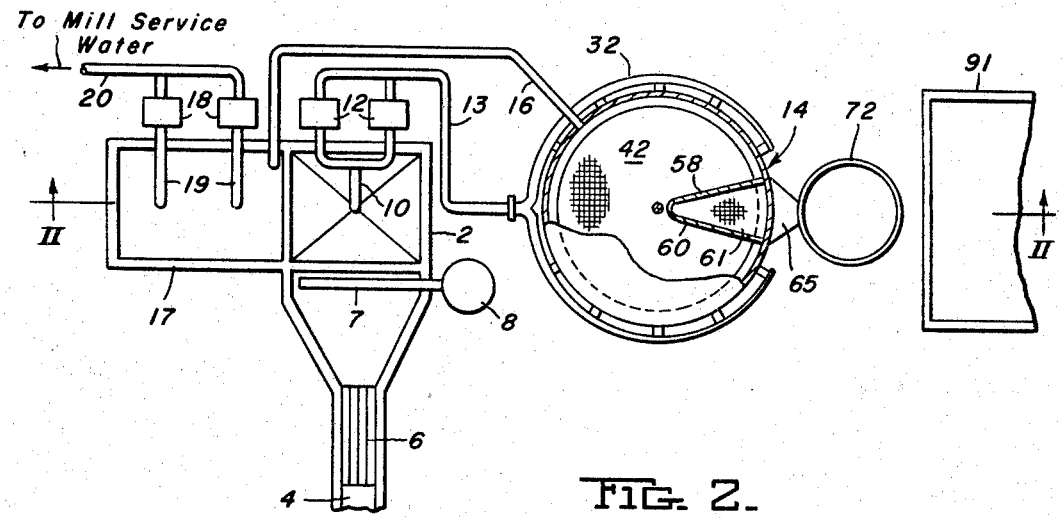
FIGURE 1 is a top plan view of apparatus for purifying scale flushing water discharged from a steel mill.

In FIGURE 1, apparatus for purifying mill scale flushing water includes a mill scale well 2 into which water to be purified is channelled by a trough 4. The larger scale particles in the water are removed by a bar screen 6 in trough 4, and oils are skimmed from the surface of the water by a skimming apparatus 7 and removed to an oil storage tank 8. The water then flows into the well 2, which is provided with an overflow pipe 9 (FIGURE 2).

The water and scale in well 2 are drawn through a water pipe 10 by pumps 12. The pumps 12 pump the water and scale particles through a pipe 13 and into a scale separation tank 14. When the scale particles have been removed by apparatus in tank 14 to be described, the water flows into a weir 15 near the top of the tank (FIGURE 2), and then downward by gravity through a pipe 16. The pipe 16 conveys the water into a clear water well 17, shown on the left side of the mill scale well 2. Pumps 18 adjacent the clear water well draw the water from the well through pipes 19, and pump it into the mill service water system through a pipe 20. The well 17 is provided with an overflow pipe 21.

Figure 2:
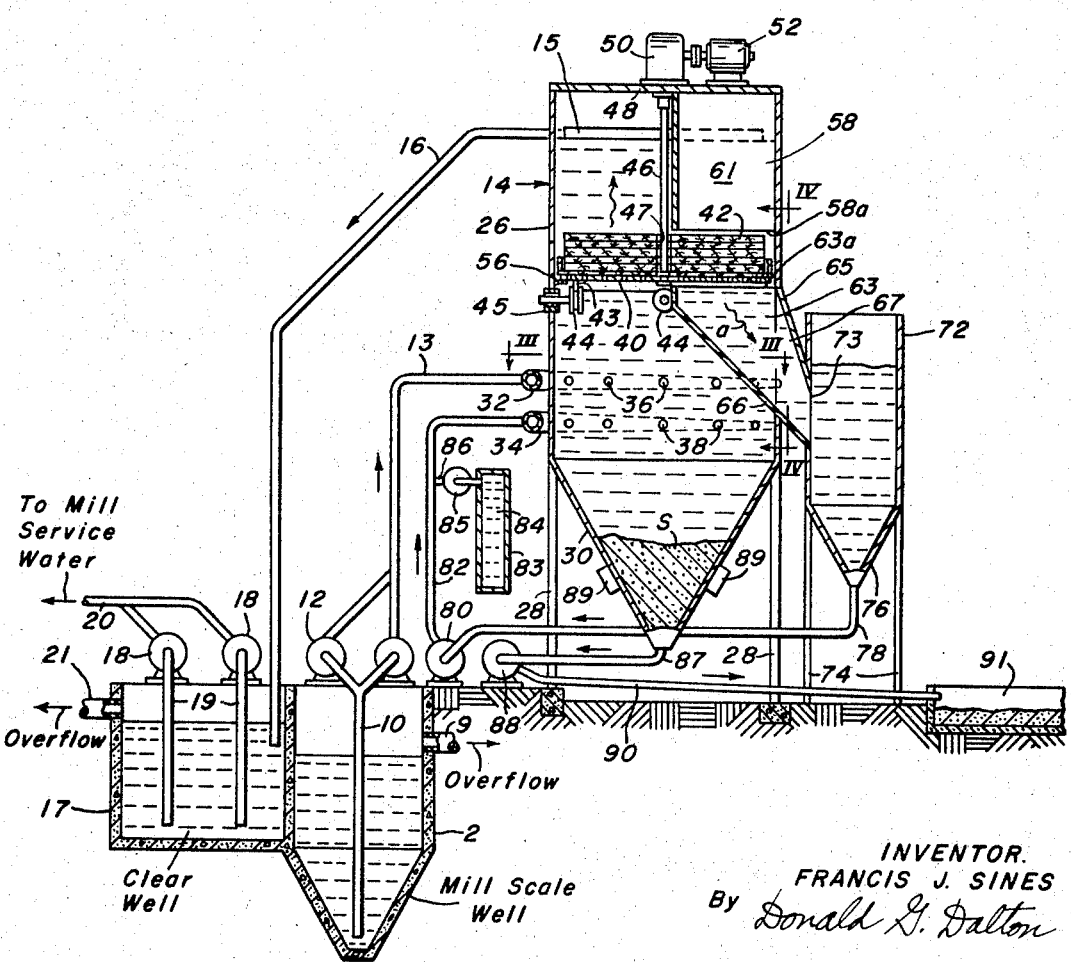
FIGURE 2 is a vertical sectional view of the apparatus of FIGURE 1 taken through lines II—II of FIGURE 1.

The scale removal tank 14, shown in vertical section in FIGURE 2, includes cylindrical wall portion 26, supported on legs 28, and a bottom funnel-shaped portion 30 depending between the legs 28.

Around the cylindrical wall portion 26 are welded upper and lower bustle pipes 32 and 34, respectively. As shown in the enlarged view of bustle pipe 32 in FIGURE 3, short tubes 36 extend between the pipe 32 and the wall of the tank, and these tubes conduct water and particles from the bustle pipe to the inside of the tank. The pipe 32 is connected at the mid-point of its length to the water pipe 13 leading from the mill scale well 2. From this connection, the pipe 32 divides into two branches which wrap around opposite sides of the tank 14. Each branch has a diameter that gradually diminishes as the distance from the connection with the pipe 13 becomes greater, so that the water pressure and flow through each of the tubes 36 will be approximately the same.

The water and scale particles passing into the tank through tubes 36 will thus be distributed evenly around the circumference of the tank, thus minimizing the turbulence in the part of the tank adjacent the tubes 36. This low turbulence will aid in accomplishing the main objective of the tank 14 and its associated apparatus, which is to cause the scale particles suspended in the water settle into the bottom funnel-shaped portion 30 of the tank.

Figure 3:
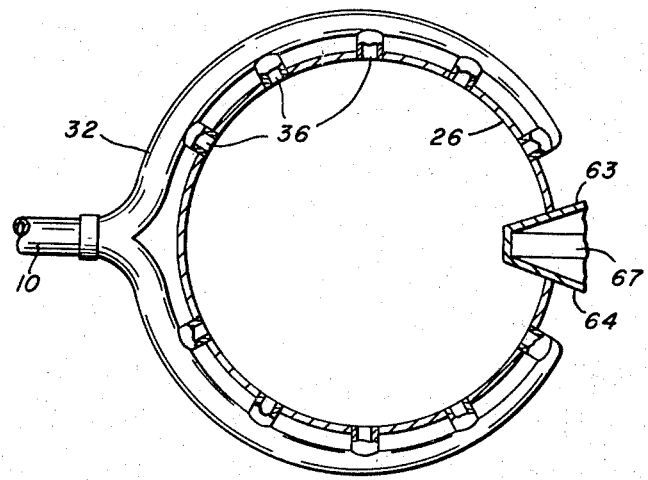
FIGURE 3 is a horizontal sectional view of a portion of the apparatus of FIGURES 1 and 2 taken through lines III—III of FIGURE 2.

The lower bustle pipe 34 (FIGURE 2) has the same shape as the upper pipe 32 shown in FIGURE 3, and tubes 38 feed water and particles from the pipe 34 into the tank 14 in the same manner as the tubes 36 in pipe 32. However, the pipe 34 is connected to another source of water and scale particles, to be described later.

Inside the tank 14 and above the inlet tubes 36 is mounted a circular perforated plate 40 on which rests filter screens 42. The screens 42 are for filtering scale particles out of water which passes upwardly therethrough, and the openings in the screens are graduated from bottom to top. It is suggested that the bottom screen be No. 4 mesh, that the top screen be No. 100 mesh, and that the intermediate screens have openings of sizes that are between those of the top and bottom screens. In place of these screens, other filtering means may be substituted, such as gradated sand layers with the sand particles decreasing in size from bottom to top.

The plate 40 which supports the filter elements 42 has mounted on its underside surface a circular rail 43 which rides on a plurality of flanged idler wheels 44. The wheels 44 are spaced around the inside circumference of the tank and are rotatably mounted in bearings 45 in the tank wall. The plate 40 is secured to a vertical shaft 46 which extends upward through central openings 47 in the filter screens 42 and is rotatably supported in a thrust bearing 48 mounted in the top wall of tank 14. Above the tank, the shaft 46 is connected to a gear reducer 50 and motor 52, which are mounted on the top of the tank. The motor 52 is thus capable of rotating the shaft 46, the plate 40, and the filter screens 42.

A neoprene seal member 56 is mounted on the edge of the plate 44 to confine the upward flow of water in the tank 14 to a path through the filter screens 42. The seal member 56 extends outwardly from the plate 44 into a sliding, sealing engagement with the adjacent cylindrical wall 26 of the tank 14.

Partitions 58 and 60 are welded to the inside of the wall of tank 14 above the filter screens 42, as shown in FIGURE 1. These partitions define a sector-shaper chamber 61 within the tank 14, and their respective bottom edges 58a and 60a (FIGURES 2 and 4) are spaced with a very close clearance above the top of the screens 42. This close clearance prevents the water in the tank 14 from filling up the chamber 61.

Below the perforated plate 40 holding the filter screens 42, a second pair of partitions 63 and 64 are welded to the wall of tank 14. The top edge 63a of partition 63 (FIGURE 2) and the top edge of partition 64, not shown, are spaced very close to the plate 40 holding the filter screens 42. These edges form a sector with the cylindrical tank wall 26 that is congruent with and in line with the sector formed by the edges 58a and 60a of the partitions above the screens.

Figure 4:
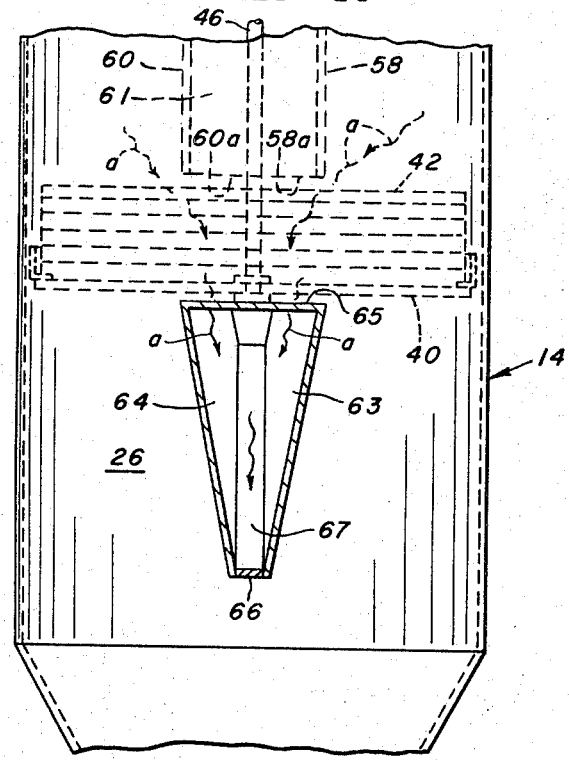
FIGURE 4 is a vertical sectional view of another portion of the apparatus of FIGURES 1 and 2 taken through lines IV—IV of FIGURE 2.

Below the screens 42, the partitions 63 and 64 are connected by top and bottom plates 65 and 66 to form a passageway 67, and water from other parts of the tank 14 above the filter screens 42 may pass down through the filter screens and into this passageway, as indicated by arrows a in FIGURES 2 and 4. The walls of passageway 67 extend through the cylindrical wall 26 to the exterior of the tank 14. Outside the tank 14, these walls are welded to a filter wash water tank 72 (FIGURE 2) and water and scale particles in the passageway 67 flow into the tank 72 through an opening 73 in the tank wall.

The tank 72 is supported on legs 74, between which depends a funnel-shaped portion 76. At the bottom of the portion 76 is connected a pipe 78 which leads to a pump 80. The pump 80 pumps the water and particles from the tank 72 through the pipe 78 and into a pipe 82 that is connected to the lower bustle pipe 34. The water and particles in the tank 72 are thus reintroduced into the tank 14.

As an optional feature, a tank 83 filled with flocculation chemicals 84 is provided adjacent the pipe 82. These chemicals may be added to the water and particles in the pipe 82 by means of a pump 85, which pumps the chemicals from the tank 83 through a pipe 86.

At the bottom of the funnel-shaped portion 30 of the tank 14 is connected a sludge pipe 87 leading to a sludge pump 88. Electric vibrators 89 are mounted on the walls of the funnel portion 30 and vibrate these walls to break up the sludge S formed by the scale particles falling to the bottom of tank 14. Aided by the vibrators 89, the pump 88 draws the sludge S out through pipe 87 and pumps it through pipe 90 into drying bins 91 shown on the right-hand side of FIGURES 1 and 2.

In operation, the scale flushing water first has the larger scale particles therein removed by the bar screen 4 (FIGURE 1) and surface oil is removed by skimming apparatus 7. The water and smaller scale particles are then introduced into the scale separation tank 14 through the bustle pipe 32 and tubes 36 (FIGURE 2). When the tank is filled to a level above the filter screens 42, the water entering at the tubes 36 flows gradually upward through the perforated plates 40 and filter screens 42 supported thereon. Some of the scale particles entering with the water are carried upward by this gradual flow and are trapped in the filter screens 42, which are being rotated slowly by the motor 52. The water in the tank rising above the filter screens thus becomes pure enough to be either reused in the service water system of a steel mill or discharged into a river.

Meanwhile, the water below the bustle pipes 32 and 34 remains quiescent and the even distribution of the flow of water through the tubes 36 and 38 minimizes turbulence in the area where water and particles enter the tank. Thus, a large number of the particles entering through the tubes 36 fall downward through this water and rest in the funnel portion 30 of tank 14, forming sludge S (FIGURE 2).

Most of the filtered water above the screens 42 eventually rises to the level of the weir 15, from where it flows out of the tank 14 and into the pipe 16 leading to the clear water well 17. However, a limited amount of pure water above the screens 42 passes back down through the screens and into the passageway 67, as shown by the arrows a. As this "backwash" water passes down through the screens, it washes away particles trapped in the sector of the screens which is directly above the passageway 67. Oils deposited on the screens are also removed in this process by the scraping action of the scale particles as they are washed away.

Since there is no head of water directly above the passageway 67, owing to the chamber 61 being empty, the amount of water flowing into the passageway 67 is small compared to the total amount of water above the screens 42. Also, the resistance to this water flow is great, since the edges of the walls of the chamber 61 and passageway 67 adjacent the screens 42 are spaced very close to the screens, thus forcing most of the water flowing into passageway 67 to flow laterally as well as downwardly through the screens 42. This resistance insures that most of the pure water in the tank above the screens 42 will flow out through the weir 15 instead of through the passageway 67.

As the filter screens are rotated about the shaft 46, all parts of the screens are passed periodically over the passageway 67 and are thus washed and cleaned of the scale particles and oils which they pick up from the upward rising water in the main part of the tank 14. The filter screens are rotated at speeds of between one and three revolutions per minute, depending on how fast particles are collected from the water passing upward through the screens.

The backwash water and particles in the passageway 67 flow into the filter wash water tank 72, where they accumulate. The pump 80 pumps the wash water and particles from the bottom of tank 72 through pipes 78 and 82 and into the lower bustle pipe 34, from where they are reintroduced into the tank 14 through the tubes 38. As with the water entering the tank through the pipe 32, the water entering through the bustle pipe 34 and tubes 38 will gradually rise upward, but many of the scale particles which would otherwise rise with the water from the tubes 38 are trapped by the large number of scale particles which are falling downward from the tubes 36. These trapped particles are thus carried downward through the quiescent water in the funnel-shaped portion 30 of the tank and are accumulated with the other particles falling to the bottom of the tank. By trapping the particles which have a tendency to rise upward, many particles which would normally remain suspended in the water for long periods of time are brought to the bottom of the tank rather quickly.

A few of the particles re-entering the tank through the tubes 38 will rise up through the tank to be trapped again in the screens 42, and these particles will again be carried by the backwashing water into the tank 72. Some of the particles may have to be backwashed through the filter screens several times before they are finally carried down to the bottom of the tank 14, but this repeated backwashing of the same particles may be reduced by pumping flocculation chemicals 83 into the water and particles in the pipe 82. These chemicals will cause the particles to stick together and form larger masses which are more likely to fall to the bottom of the tank 14.

When the sludge S formed by the scale particles falling to the bottom of the funnel portion 30 builds up to an appropriate level, the sludge pump 88 is turned on and the sludge is withdrawn from the tank 14 through the pipes 87 and 90 to the drying beds 91. While the sludge is being pumped out, vibrators 89 are operated to break up and loosen the sludge from the walls of the tank so as to make its withdrawal easier. The sludge S is pumped out as often as is necessary during the purification of the scale water in tank 14.

A means and method are thus provided whereby particles are removed from water by a combination of filtering and sedimentation processes that are carried out in a relatively compact tank, as compared to the large sedimentation basins used previously. The filter elements are continuously cleaned by backwashing, and this cleaning is performed on one part of the screens while other areas are in use gathering more particles from contaminated water. Thus, the process need not be interrupted for the purpose of changing filter elements or cleaning them. In addition, the efficiency of the system is increased by reintroducing the filter backwash water into the tank. This allows the particles which settle to the bottom on their first entrance into the tank to gather additional particles on their way down and thus increase the overall rate of sedimentation within the tank.

While I have illustrated and described one embodiment of my invention, it will be apparent that adaptations and modifications may be made without departing from the scope of the appended claims.

I claim:

1. Apparatus for removing solid particles from a liquid comprising a tank for holding said liquid, means for introducing said liquid with said particles into said tank at an elevation above the bottom of the tank, a filter element mounted within said tank above said elevation at which said liquid and particles are introduced, means to confine the upward flow of liquid in said tank to a path through said filter element, a liquid conducting means having an opening within said tank located adjacent a portion of the underside of said filter element so as to receive liquid passing downwardly through said element, means for rotating said filter element so that various parts of said element pass over said opening in said liquid conducting means, and means located above said filter element for drawing off liquid from said tank.

2. Apparatus according to claim 1 including means connected to said liquid conducting means for receiving liquid and particles therefrom and reintroducing them into said tank at an elevation beneath said first means for introducing liquid and above said tank bottom.

3. Apparatus for removing solid particles from a liquid comprising a tank for holding said liquid, a bustle pipe mounted around said tank at an elevation above the bottom of the tank, means for conducting water and particles from said bustle pipe into said tank, means connected to said bustle pipe for forcing said liquid with said particles through said bustle pipe and into said tank through said conducting means, a filter element mounted within said tank above the elevation of said bustle pipe, means to confine the upward flow of liquid in said tank to a path through said filter element, a liquid conducting means having an opening into said tank located adjacent a portion of the underside of said filter element so as to receive liquid passing downwardly through said element, means for rotating said filter element so that various parts of said element pass over said opening in said liquid conducting means, and means connected to said tank above said filter element for drawing off said liquid.

4. Apparatus according to claim 3 including means connected to said liquid conducting means for receiving liquid and particles therefrom and reintroducing them into said tank, said last named means having its outlet into said tank at an elevation beneath said first means for introducing liquid and above said tank bottom.

5. Apparatus of claim 4 including means connected to said last named means for introducing flocculation chemicals into said liquid and particles prior to reintroduction into said tank.

6. Apparatus of claim 3 including a partition mounted above said filter element so as to isolate a section of said tank above a portion of said filter element and prevent the upward flow of water into said section.

7. Apparatus for removing solid particles from a liquid comprising a tank for holding said liquid, a bustle pipe mounted around said tank at an elevation above the bottom of the tank, means for conducting water and particles from said bustle pipe into said tank, means connected to said bustle pipe for forcing said liquid with said particles through said bustle pipe and into said tank through said conducting means, a filter element mounted within said tank above the elevation of said bustle pipe, means to confine the upward flow of liquid in said tank to a path through said filter element, a liquid conducting means having an opening into said tank located adjacent a portion of the underside of said filter element so as to receive liquid passing downwardly through said element, means for rotating said filter element so that various parts of said element pass over said opening in said liquid conducting means, means connected to said tank above said filter element for drawing off said liquid, and means connected to the bottom of said tank for withdrawing particles collected at said bottom and conveying said particles to an appropriate disposal area.

8. Apparatus of claim 7 wherein the bottom portion of said tank is in the shape of an inverted cone, said means for withdrawing particles including vibrating means connected to said bottom portion of the tank and pumping means connected to said tank at the bottom of said inverted cone-shaped portion.

9. A method of removing solid particles from a liquid comprising the steps of introducing said liquid and particles into a tank containing said liquid at an elevation intermediate the bottom of said tank and the top surface of said liquid, trapping in a filter the particles in said liquid carried upward from said intermediate elevation by the upward movement of said liquid flowing into said tank, collecting the particles which fall downward from said elevation at the bottom of said tank, drawing off some of the liquid which has risen above said filter back down through a portion of the filter and out of said tank, whereby particles trapped in said portion of the filter are removed and said portion of the filter is cleaned for reuse, alternatingly cleaning other portions of said filter in the same manner, and drawing off from said tank above said filter liquid which is substantially free of said particles.

10. The method of claim 9 including the step of periodically withdrawing the particles collected in the bottom of said tank and removing them to an appropriate disposal area.

11. The method of claim 9 including the step of reintroducing the said liquid and particles drawn off through said filter back into said tank at a second elevation intermediate the bottom of said tank and said first mentioned elevation where liquid is introduced, whereby some of said particles reintroduced at said lower elevation are trapped by particles falling from said first mentioned elevation and other of said reintroduced particles are carried upward and trapped again in said filter.

12. The method of claim 11 including the step of introducing flocculation chemicals into said liquid drawn off through said filter before it is reintroduced into said tank, whereby the particles in said liquid become attracted to each other and form masses of particles.

References Cited

UNITED STATES PATENTS

| | | | |
|---|---|---|---|
| 2,066,479 | 1/1937 | MacIsaac | 210—411 X |
| 2,097,876 | 11/1937 | Fuetterer | 210—51 |

FOREIGN PATENTS

| | | |
|---|---|---|
| 976,760 | 4/1950 | France. |

SAMIH N. ZAHARNA, *Primary Examiner.*